Patented Nov. 12, 1935

2,020,655

UNITED STATES PATENT OFFICE 2,020,655

PURIFIED NEOARSPHENAMINE AND PROCESS OF PREPARING THE SAME

George W. Raiziss and Abraham I. Kremens, Philadelphia, Pa., assignors to Abbott Laboratories, North Chicago, Ill., a corporation of Illinois No Drawing. Application February 19, 1931, Serial No. 517,102

4 Claims. (Cl. 260—15)

Our invention relates to an improvement in derivatives of dihydroxydiamino-arsenobenzene in the preparation of which sodium formaldehyde sulfoxylate is employed as one of the reaction ingredients, and particularly to sodium dihydroxydiamino-arsenobenzene-methylene sulfinate, known as neoarsphenamine.

The sodium formaldehyde sulfoxylate, a necessary ingredient in the production of such substances, as now obtainable, contains an excess of free formaldehyde. This free formaldehyde, which is liberated in solution, has an unfavorable effect upon the neoarsphenamine or other resulting product, adversely affecting the color, stability, toxicity, and therapeutic efficiency thereof.

Various attempts have been made to free sodium formaldehyde sulfoxylate by chemical means of this undesirable free formaldehyde, but such means have been, on the whole, unsuccessful, due to the ease with which the sulfoxylate decomposes, liberating free formaldehyde and losing its reducing power. Hence, it must be accepted as a premise that it is impossible to obtain by methods known at the present time a sodium formaldehyde sulfoxylate which is free from uncombined formaldehyde.

An object of our invention, therefore, is to provide a new and improved method, especially adapted for use in connection with the usual process for manufacturing neoarsphenamine, of treating sodium formaldehyde sulfoxylate, whereby the free formaldehyde present in the sulfoxylate may be "neutralized" and its undesirable effects in the final product thus completely eliminated.

Another object is to provide neoarsphenamine which is practically free from the effects of uncombined formaldehyde and of superior color, stability, non-toxicity, and therapeutic efficiency to similar products heretofore known. It is common knowledge that a light yellow color in a sample of neoarsphenamine is indicative of greater purity, lower toxicity, and general superiority to one which is of a brown or orange tint.

We have discovered the following means for accomplishing the above object.

In our preferred embodiment we add to the solution of sodium formaldehyde sulfoxylate which is to go into the reaction for the preparation of neoarsphenamine or the like, a relatively small quantity of a suitable reducing agent which has an affinity for formaldehyde, such as sodium hydrosulphite or sodium bisulphite. The amount of added reducing agent may be from 5 to 10 per cent, preferably about 7 per cent, of the sulfoxylate used. This solution is then used in the usual manner for the preparation of neoarsphenamine. Our preferred method is as follows:—

To a solution of 120 grams of sodium formaldehyde sulfoxylate in 150 cc. of water is added 10 grams of sodium hydrosulphite and the mixture is shaken for several minutes.

The undissolved particles of sodium hydrosulphite are filtered off and the clear solution is added to a solution of 200 grams of arsphenamine in 2000 cc. of absolute methyl alcohol. The mixture is then neutralized in the usual manner with sodium carbonate and precipitated by ether and alcohol.

During the usual reaction which occurs in the preparation of neoarsphenamine, the formaldehyde sulfoxylate undergoes decomposition with the formation of free formaldehyde, and the sodium hydrosulphite or bisulphite which has been added in accordance with our invention takes care of this uncombined formaldehyde as well as the free formaldehyde which was originally present as an impurity in the sulfoxylate.

While we do not wish to be limited to any particular theory of reaction, it is believed that the reducing agent added in accordance with our invention acts as a catalytic substance, continuously regenerating formaldehyde sulfoxylate, which in turn may undergo decomposition. The presence of a slight excess of the reducing agent in the final product is of no deleterious effect.

Neoarsphenamine and like products prepared in accordance with our invention are highly superior products to those ordinarily obtained, being of improved color, stability, non-toxicity, and therapeutic efficiency.

Various modifications of our process will doubtless occur to those skilled in the art. Hence, we do not wish to be limited to the precise method or products disclosed except as set forth in the appended claims, which are to be interpreted as broadly as the state of the art permits.

We claim as our invention:

1. In the process of preparing neoarsphenamine by the reaction of sodium formaldehyde sulfoxylate and arsphenamine, the improvement which consists in adding to the reaction mixture a relatively small quantity of a reducing agent which is a member of the group consisting of sodium bisulphite and sodium hydrosulphite.

2. An improved neoarsphenamine produced from sodium formaldehyde sulfoxylate and arsphenamine, characterized by superior color, low toxicity, high therapeutic efficiency, and stability, and being substantially free from uncombined formaldehyde, and prepared by including in the reaction mixture a relatively small quantity, as compared with the above reagents, of a reducing substance which will convert any free formaldehyde present into formaldehyde sulfoxylate.

3. An improved neoarsphenamine produced from sodium formaldehyde sulfoxylate and arsphenamine, characterized by superior color, low toxicity, high therapeutic efficiency, and stability, and being substantially free from uncombined formaldehyde and prepared by including in the reaction mixture a relatively small quantity, as compared with the above reagents, of a reducing agent, which is a member of the group consisting of sodium hydrosulphite and sodium bisulphite.

4. The improvement in the manufacture of neoarsphenamine, which comprises adding to a solution of arsphenamine a solution of sodium formaldehyde sulfoxylate, and a reducing agent which is a member of the group consisting of sodium hydrosulphite and sodium bisulphite, neutralizing the mixture, and precipitating the neoarsphenamine by the addition of a liquid in which it is insoluble.

GEORGE W. RAIZISS.
ABRAHAM I. KREMENS.